(12) United States Patent
Kim et al.

(10) Patent No.: US 6,493,173 B1
(45) Date of Patent: Dec. 10, 2002

(54) HEADERLESS DISK DRIVE COMPRISING REPEATABLE RUNOUT (RRO) CORRECTION VALUES RECORDED AT A USER DATA RATE

(75) Inventors: Yoo H. Kim, Laguna Niguel, CA (US); Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/436,930

(22) Filed: Nov. 8, 1999

(51) Int. Cl.[7] ............................................... G11B 15/46
(52) U.S. Cl. ................................................. 360/77.04
(58) Field of Search .......................... 360/77.04, 77.01, 360/77.02, 77.05, 77.06, 77.07, 77.08

(56) References Cited

U.S. PATENT DOCUMENTS 5,585,976 A  * 12/1996  Pham ..................... 360/77.04
5,793,559 A     8/1998  Shepherd et al.
5,825,578 A    10/1998  Shrinkle et al.
6,049,440 A     4/2000  Shu
6,097,565 A     8/2000  Sri-Jayantha et al.

* cited by examiner

Primary Examiner—David Hudspeth
Assistant Examiner—Mitchell Slavitt
(74) Attorney, Agent, or Firm—Milad G. Shara, Esq.; Howard H. Sheerin, Esq.

(57) ABSTRACT

A disk drive is disclosed comprising a track recorded on a disk, wherein the track has repeatable runout (RRO). The track comprises a plurality of embedded servo sectors including servo information stored at a servo data rate, and a plurality of data sectors between the embedded servo sectors. The track is headerless in that the plurality of data sectors are uninterrupted by sector identification data. One of the plurality of data sectors includes a RRO correction value used to compensate for the RRO, the RRO correction value being stored at a user data rate different than the servo data rate. The disk drive further comprises a head and a voice coil motor (VCM) for positioning the head over the track. A servo control system, responsive to the servo information and the RRO correction value, generates a VCM control signal that is applied to the VCM for positioning the head over the track.

10 Claims, 7 Drawing Sheets

HEADERLESS DISK DRIVE COMPRISING REPEATABLE RUNOUT (RRO) CORRECTION VALUES RECORDED AT A USER DATA RATE

CROSS REFERENCE TO RELATED APPLICATIONS

This application is related to co-pending U.S. patent application Ser No. 08/946,805 entitled "REPEATABLE RUNOUT CANCELLATION IN SECTOR SERVO DISK DRIVE POSITIONING SYSTEM" the disclosure of which is incorporated herein by reference.

BACKGROUND OF THE INVENTION

1. Field of the Invention

The present invention relates to disk drives. More particularly, the present invention relates to a headerless disk drive comprising repeatable runout (RRO) correction values recorded at a user data rate.

2. Description of the Prior Art

The above-referenced co-pending patent application Ser. No. 08/946,805 discloses a disk drive which stores correction values to attenuate repeatable runout (RRO), a disturbance in the servo control system due to eccentricities and other distortions in a track recorded on the disk. RRO is a predictable disturbance that is periodic with the rotation of the disk; therefore, it can be estimated and RRO correction values introduced into the servo loop as a correction signal in order to attenuate the RRO from the servo control effort.

It is known to calibrate and store the RRO correction values in embedded servo sectors during manufacturing of the disk drive. During user operations, the RRO correction values are retrieved from the embedded servo sectors and used to compensate for the RRO in the servo control system. However, the disk drive is designed to prevent writing to the embedded servo sectors during user operations in order to protect the integrity of the servo information. Thus, the prior art teaches that the RRO correction values are recorded in the servo sectors during manufacturing, after which the RRO correction values are not modified over the life of the disk drive.

In U.S. Pat. No. 5,825,578 a disk drive is disclosed wherein the RRO correction values may be stored in a header of a data sector. The header stores sector identification (ID) data which is used to verify the correct location of the head before reading or overwriting a data sector. In "headerless" disk drives (otherwise referred to as ID-less disk drives), sector headers are not used and instead the sector identification data is stored in the embedded servo sectors. The above-referenced U.S. Pat. No. 5,825,578 teaches that for headerless disk drives, the RRO correction values are stored in the embedded servo sectors.

FIG. 1A shows an example format of a disk 2 typically employed in a headerless, magnetic disk drive. The disk 2 comprises a plurality of concentric tracks 4 partitioned into a number of headerless data sectors 6 with embedded servo sectors 8 recorded at a regular interval around the disk 2. The data sectors 6 store the user data received from the host computer, and the embedded servo sectors 8 store servo information for use in positioning a head over a centerline of a selected track 4 while writing data to or reading data from the disk 2. The embedded servo sectors 8 also store sector identification data for identifying the data sectors 6 during read and write operations.

In order to increase the capacity of the disk drive, a more constant linear recording density is achieved by banding the tracks 4 into predefined zones and increasing the data rate from the inner diameter zones to the outer diameter zones. The data rate can be increased in the outer diameter tracks 4 due to the increase in circumferential recording area. The zoned recording technique is illustrated in FIG. 1A wherein the disk 2 comprises an inner zone 10 for storing fourteen data sectors 6 per track 4 and an outer zone 12 for storing twenty eight data sectors 6 per track 4. In practice, the disk 2 is actually partitioned into numerous zones with the data rate increasing incrementally from the inner to outer diameter zones.

The embedded servo sectors 8 are typically recorded at a lower data rate than the data sectors 6. The embedded servo sectors 8 are also typically not zoned but are instead recorded at the same data rate from the inner to outer diameter tracks 4. An example format of an embedded servo sector 8, as shown in FIG. 1B, includes a preamble field 14, a sync mark field 16, a servo information field 18, and servo bursts 20. An acquisition preamble (e.g., a 2T acquisition preamble) is typically recorded in the preamble field 14 which enables a read channel within the disk drive to acquire the appropriate timing and amplitude information from the read signal before reading the servo information. A sync mark (typically fault tolerant) is recorded in the sync mark field 16 and used to symbol synchronize the servo information stored in the servo information field 18. The servo information typically includes a servo track address which identifies the current track the head is over while the head is seeking to a selected track, as well as sector identification data used to identify the data sectors 6 of the tracks 4. The servo bursts 20 are groups of pulses recorded at precise intervals and offsets from a track's centerline. The servo bursts 20 provide fine position information for the head with respect to the track centerline, and are used during read or write operations by the servo control system to maintain the head over the centerline of the selected track.

As described above, it is known to store the RRO correction values in the embedded servo sectors 8, either within the servo information field 18 or in a separate field (e.g., in a field following the servo bursts 20). However, because a disk drive is typically designed to prevent writing data in the servo sectors 8 in order to protect the integrity of the servo information, the RRO correction values stored in the servo sectors 8 cannot be modified during user operations. This technique requires that the RRO correction values calibrated during manufacturing be relatively accurate since there is no opportunity to fine tune the RRO correction values after manufacturing. This slows the manufacturing process since the accuracy of the RRO correction values is directly related to the number of revolutions used to compute the RRO correction values for each track. In addition, storing the RRO correction values in the write protected embedded servo sectors prevents adapting the RRO correction values to account for changes in the actual RRO that can occur over the life of the disk drive. Modifying the disk drive to allow data to be written to the embedded servo sectors during user operations is undesirable because of the aforementioned risk of corrupting the servo information which would render the user data recorded in the track unrecoverable. Further, designing a disk drive to allow data to be written to the servo sectors during user operations would be a significant departure from existing architectures, requiring substantial resources to develop and test.

There is, therefore, a need for a disk drive capable of storing RRO correction values in a cost effective manner without requiring significant modifications to existing disk drive architectures. Further, there is a need to update the RRO correction values in order to track variations in the actual RRO that can occur over the life of the disk drive.

SUMMARY OF THE INVENTION

The present invention may be regarded as a disk drive comprising a track recorded on a disk, wherein the track has repeatable runout (RRO). The track comprises a plurality of embedded servo sectors including servo information stored at a servo data rate, and a plurality of data sectors between the embedded servo sectors. The track is headerless in that the plurality of data sectors are uninterrupted by sector identification data. One of the plurality of data sectors includes a RRO correction value used to compensate for the RRO, the RRO correction value being stored at a user data rate different than the servo data rate. The disk drive further comprises a head, and a voice coil motor (VCM) for positioning the head over the track. A servo control system, responsive to the servo information and the RRO correction value, generates a VCM control signal that is applied to the VCM for positioning the head over the track.

The present invention may also be regarded as a method of compensating for repeatable runout (RRO) in a track recorded on a disk. The track comprises a plurality of embedded servo sectors including servo information stored at a servo data rate, and a plurality of data sectors between the embedded servo sectors. The track is headerless in that the plurality of data sectors are uninterrupted by sector identification data. One of the plurality of data sectors includes a RRO correction value used to compensate for the RRO, the RRO correction value being stored at a user data rate different than the servo data rate. A head is positioned over the track using a voice coil motor (VCM). The method further comprises the step of generating a VCM control signal in response to the servo information and RRO correction value, wherein the VCM control signal is applied to the VCM for positioning the head over the track.

DESCRIPTION OF THE PREFERRED EMBODIMENTS

System Overview

Figure 2A:
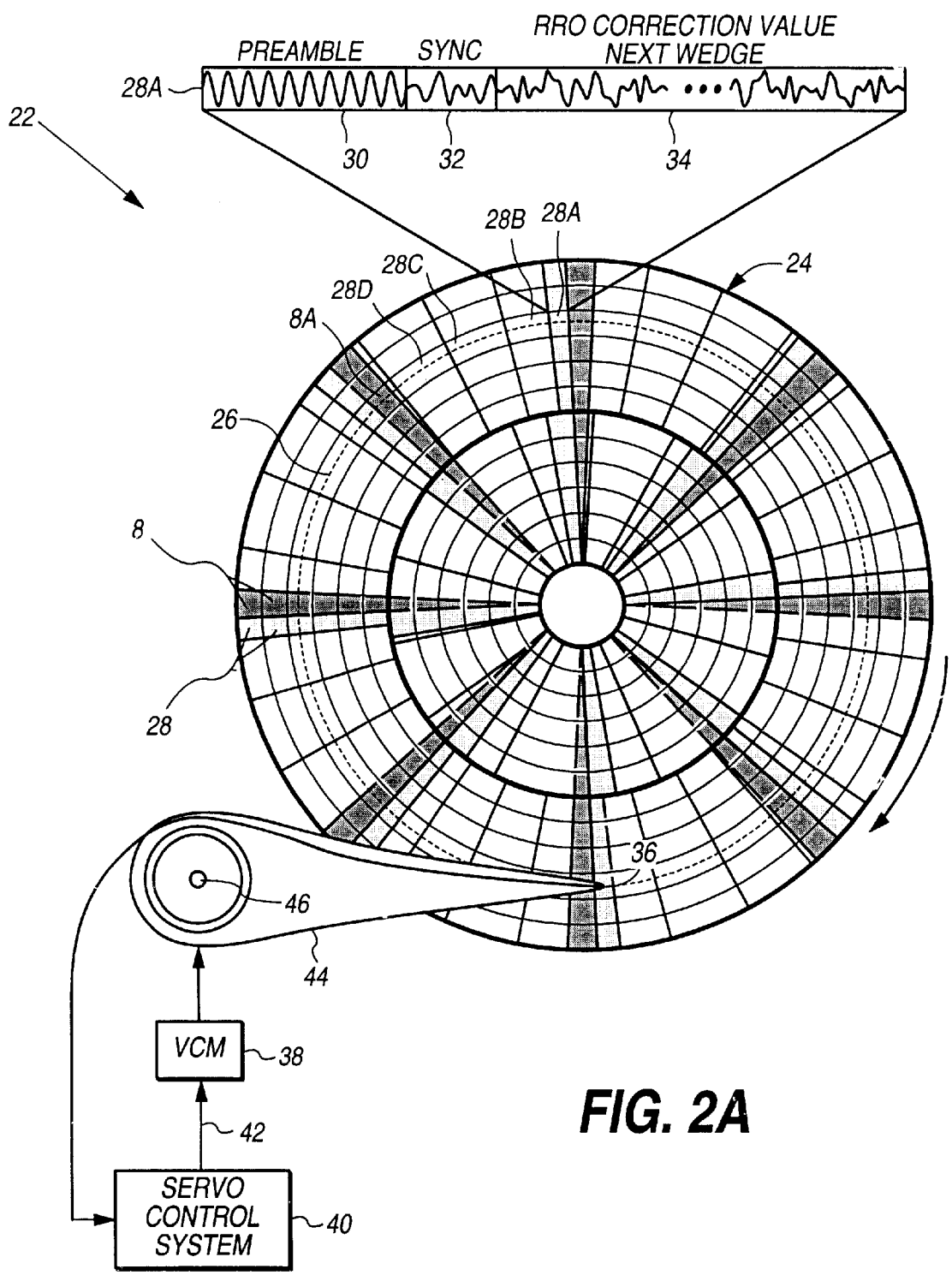
FIG. 2A is a block diagram of a disk drive according to an embodiment of the present invention, including a disk comprising a track having repeatable runout (RRO), the track comprising a plurality of embedded servo sectors including servo information stored at a servo data rate, and a plurality of headerless data sectors between the embedded servo sectors, wherein one of the headerless data sectors includes a RRO correction value processed by a servo control system which generates a control signal applied to a voice coil motor (VCM) for positioning the head over the track.

Referring now to FIG. 2A, shown is a disk drive 22 according to one embodiment of the present invention. The disk drive 22 comprises a track 26 recorded on a disk 24, wherein the track 26 has repeatable runout (RRO). The track 26 comprises a plurality of embedded servo sectors 8 including servo information stored at a servo data rate, and a plurality of data sectors 28A–28D between the embedded servo sectors 8. The track 26 is headerless in that the plurality of data sectors 28A–28D are uninterrupted by sector identification data. One of the plurality of data sectors 28A includes a RRO correction value 34 used to compensate for the RRO, the RRO correction value 34 being stored at a user data rate different than the servo data rate. The disk drive 22 further comprises a head 36 and a voice coil motor (VCM) 38 for positioning the head 36 over the track 26. A servo control system 40, responsive to the servo information and the RRO correction value 34, generates a VCM control signal 42 that is applied to the VCM 38 for positioning the head 36 over the track 26.

Figure 1A:
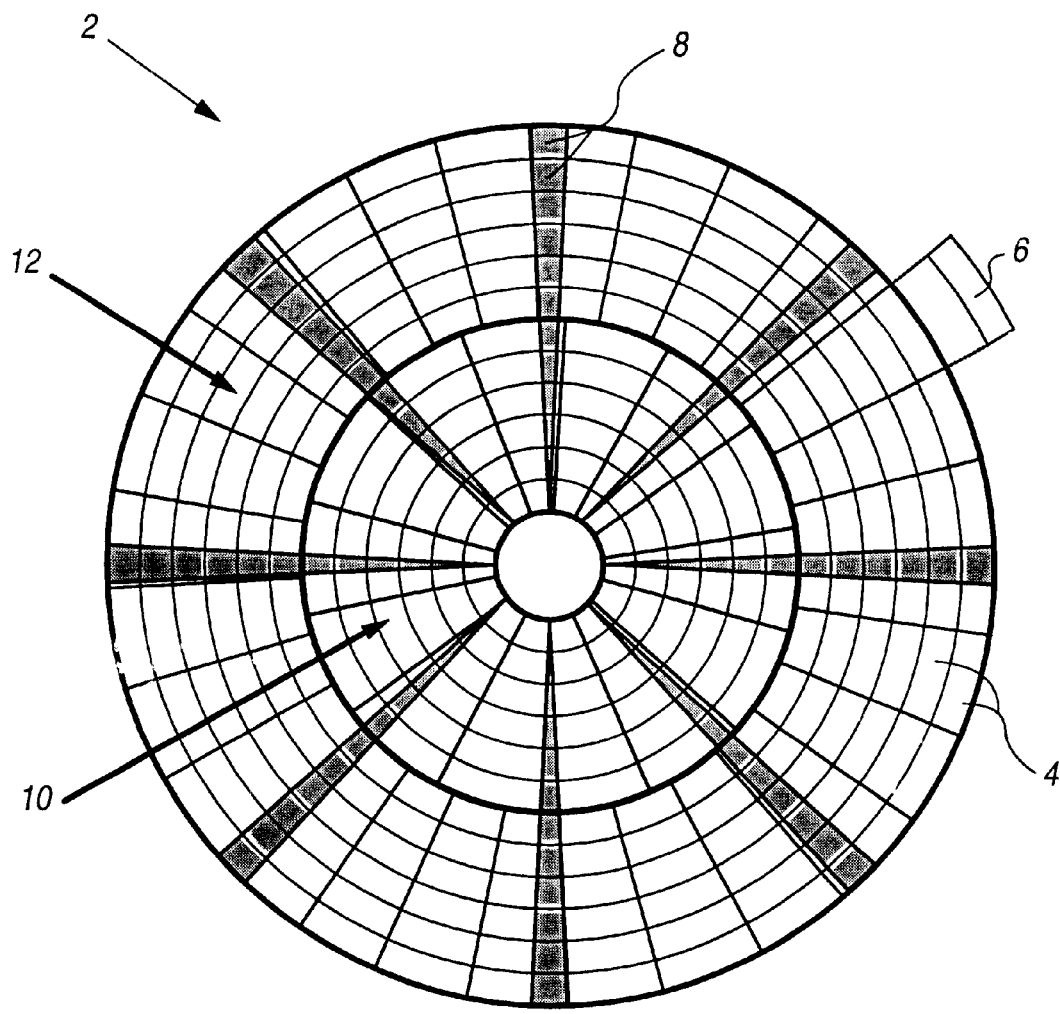
FIG. 1A shows an example format for a magnetic disk comprising a plurality of tracks partitioned into a number of data sectors recorded at a user data rate, and embedded servo sectors recorded at a servo data rate different than the user data rate.
Figure 1B:
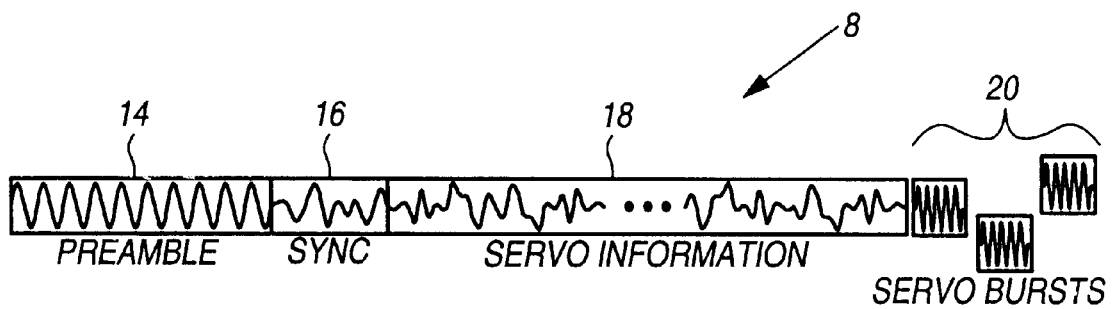
FIG. 1B shows an example format of an embedded servo sector comprising a preamble field, a sync field, a servo information field, and servo bursts.

Similar to the embedded servo sector format of FIG. 1B, each data sector 28 in the track 26 of FIG. 2A comprises a preamble field 30 used to acquire the appropriate timing and gain information from the read signal, and a sync mark 32 (typically fault tolerant) used to symbol synchronize the data recorded in the data sector 28. The data sectors 28 recorded in the track 26 store the user data received from the host as well as the RRO correction values 34. In one embodiment, the RRO correction values 34 are stored in separate data sectors 28 which do not include any user data. In an alternative embodiment, the RRO correction values 34 can be stored in data sectors 28 together with user data.

The head 36 is attached to an actuator arm 44 which is rotated about a pivot 46 by the VCM 38 in response to the VCM control signal 42 in order to maintain the head 36 over the centerline of the track 26 while writing data to or reading data from the disk 24. The servo control system 40 comprises a position error generator, such as position error generator 56 of FIG. 2B, for generating a position error signal (PES) from the servo bursts 20 recorded in the embedded servo sectors 8. Preferably, the RRO correction value 34 is combined with PES to form a corrected PES (CPES) for use in generating the VCM control signal 42. In the embodiment shown in FIG. 2A, an RRO correction value 34 is stored in a data sector 28 preceding each embedded servo sector 8. For example, the data sector 28A in FIG. 2A stores an RRO correction value 34 for the following embedded servo sector 8A. The head 36 first reads the RRO correction value 34 stored in data sector 28A, and when the head 36 reaches the corresponding embedded servo sector 8A, the RRO correction value 34 is combined with the PES to form the CPES.

Figure 2B:
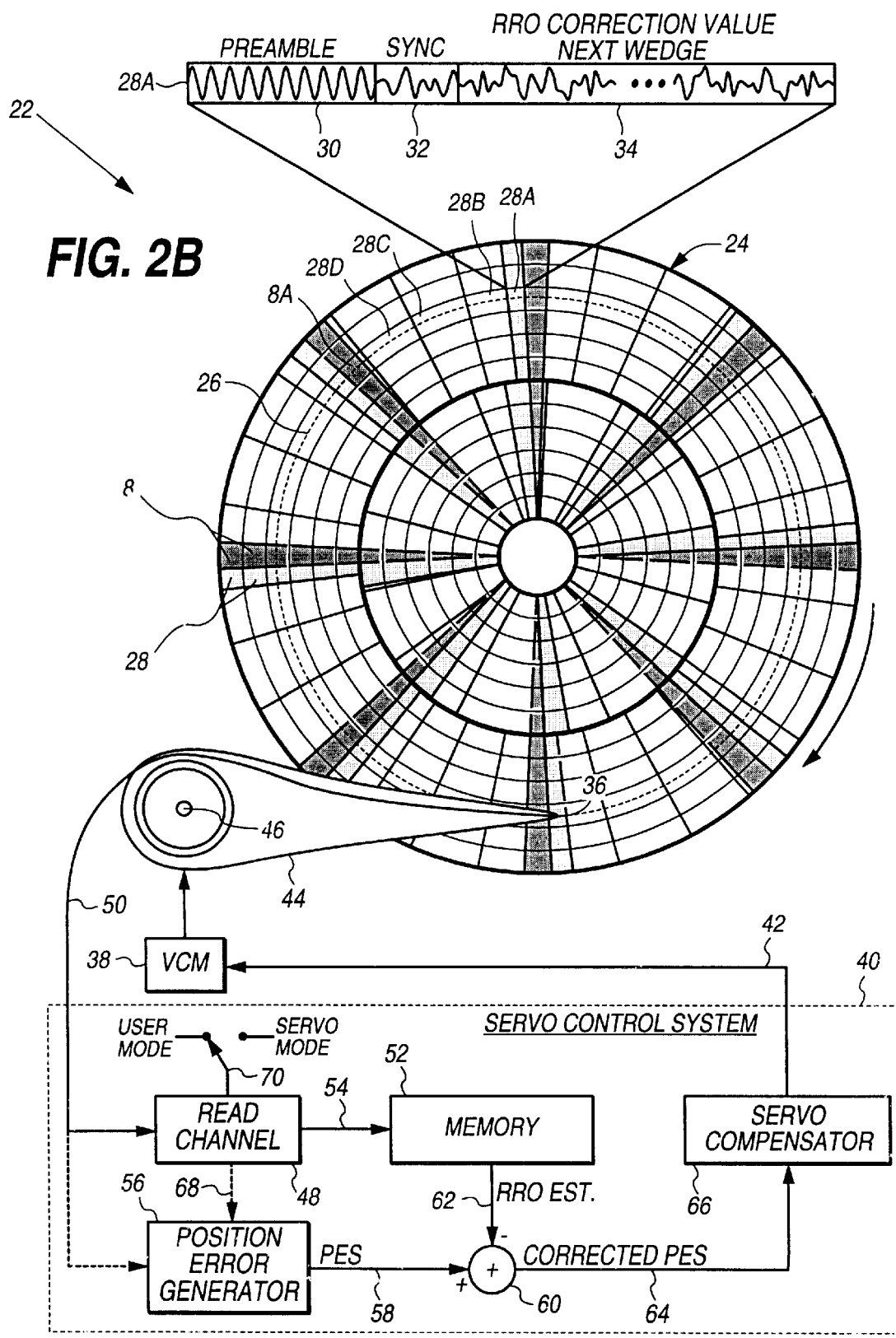
FIG. 2B shows further details of the servo control system of FIG. 2A comprising a read channel for reading the RRO correction value, a memory for storing the RRO correction value, a position error generator for generating a position error signal (PES), an adder for combining the PES with the RRO correction value to generate a corrected position error signal (CPES), wherein the CPES is applied to a servo compensator for generating the control signal applied to the VCM.

The servo control system 40, as shown in FIG. 2B, preferably comprises a read channel 48 responsive to a read signal 50 emanating from a preamp (not shown) connected to the head 36 for reading the RRO correction value 34 at the user data rate and the servo information 18 at the servo data rate. A memory 52 stores the RRO correction value 54 detected by the read channel 48. A position error generator 56 generates a position error signal (PES) 58 indicative of a location of the head 36 with respect to a centerline of the track 26. A means, such as an adder 60, combines the RRO correction value 62 stored in the memory 52 with the PES 58 when the head 36 reaches the corresponding embedded servo sector 8A, to form a corrected position error signal (CPES) 64. A servo compensator 66, responsive to the CPES 64, generates the VCM control signal 42 applied to the VCM 38 for positioning the head 36 over the track 26.

The position error signal (PES) 58 is suitably generated by measuring the area of the servo bursts 20 in the servo sector 8A, wherein the resulting servo burst area measurements are compared by the position error generator 56 to yield the head's measured offset with respect to the track centerline. The circuitry for measuring the area of the servo bursts 20 may be implemented in continuous-time by the position error generator 56 processing the analog read signal 50, or it may be implemented in discrete-time by the read channel 48 processing samples of the analog read signal 50 and then communicated to the position error generator 56 over line 68.

The read channel 48 is suitably implemented in discrete-time using partial response equalization with maximum likelihood sequence detection (PRML). The read channel 48 therefore comprises a sampler for sampling the analog read signal 50 and a suitable timing recovery circuit for synchronizing the read signal samples to the baud rate of the recorded data. The read channel 48 also comprises a suitable gain control circuit for adjusting the amplitude of the analog read signal 50 toward the desired partial response, and a suitable equalizer (analog and/or discrete) for equalizing the read signal 50 toward the desired partial response. Before reading an embedded servo sector 8 or a data sector 28, the timing recovery circuit first acquires the appropriate frequency and phase, the gain control acquires the appropriate gain by reading the acquisition preamble (e.g., acquisition preamble 14 of FIG. 1B or acquisition preamble 30 of FIG. 2A or 2B). The read channel 48 then symbol synchronizes to the data stored in the sector by detecting the sync mark (e.g., sync mark 16 of FIG. 1B or sync mark 32 of FIG. 2A or 2B).

Note that in the embodiments of FIGS. 2A and 2B the data sectors 28 which store the RRO correction values form wedges with respect to the zones whereas the embedded servo sectors 8 form wedges extending across the entire surface of the disk 24. This is due to the data rate of the data sectors 28 increasing from the inner to outer diameter zones whereas the data rate of the servo sectors 8 remains constant. The read channel 48 is configured to read at a user data rate or a servo data rate which is implemented conceptually in FIG. 2B using a switch 70. When the head 36 is over a servo sector 8, the switch 70 is set to the servo mode to configure the read channel 48 to read at the servo data rate. When the head 36 is over a data sector 28, the switch 70 is set to the user mode to configure the read channel 48 to read at the user data rate.

The modifications to the disk drive's architecture in order to store the RRO correction values 34 in the data sectors 28 is minimal since the disk drive 22 is already designed to write user data to and read user data from the data sectors 28. In other words, the data sectors 28 which store the RRO correction values 34 are treated similar to the data sectors 28 which store user data, where the procedure for writing and reading the RRO correction values 34 is essentially the same as for user data. A control program executed by a microprocessor (not shown) effectuates the reading and writing of the RRO correction values, and the read only characteristic of the servo sectors 8 remains unchanged. Thus, the RRO correction values stored in the data sectors 28 can be read, modified, and rewritten to the disk during user operations in order to fine tune the manufacturing RRO correction values, as well as to adapt the RRO correction values to variations in the actual RRO that occur over the life of the disk drive, without significant modifications to existing disk drive architectures.

Figure 3:
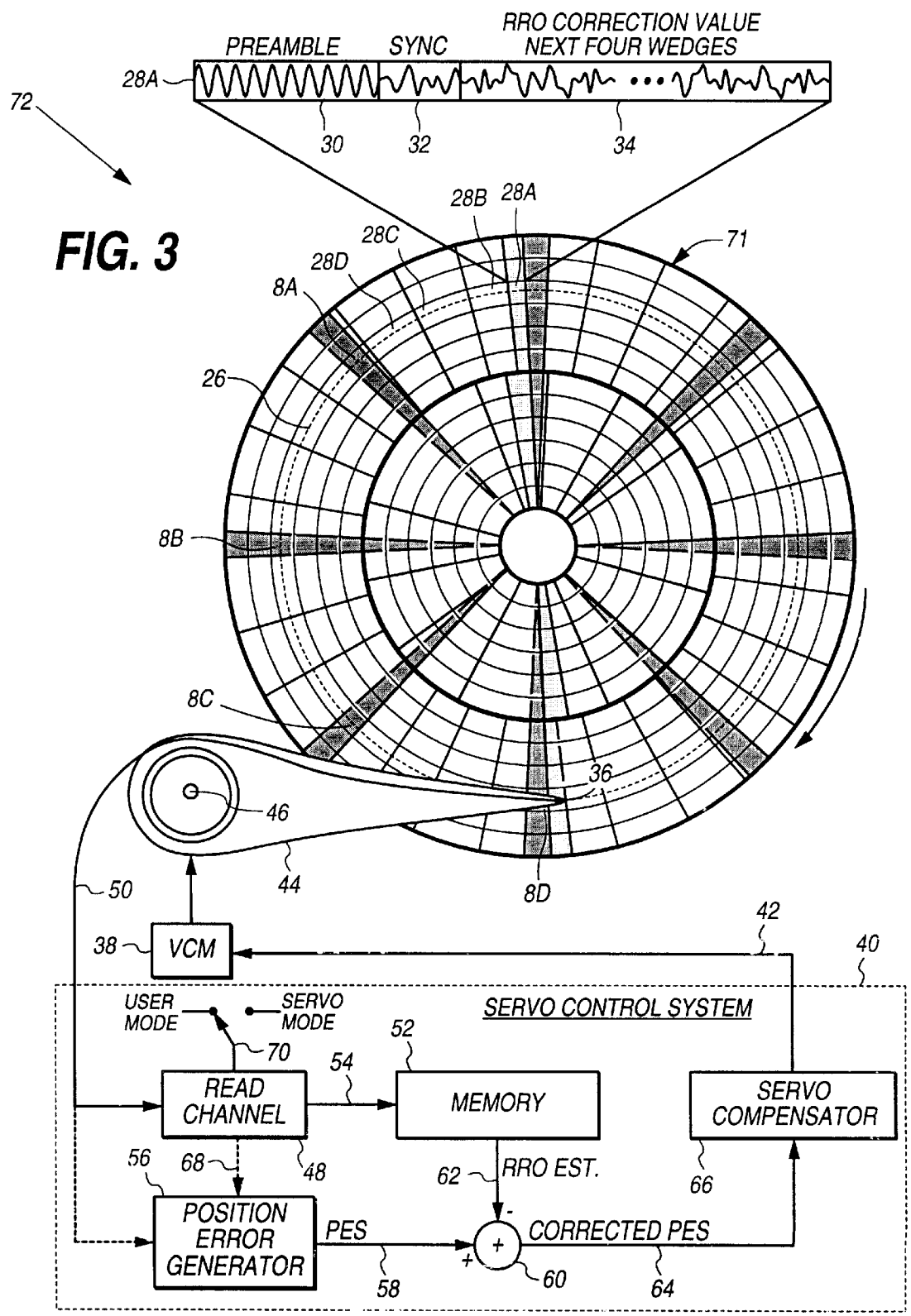
FIG. 3 shows an alternative embodiment of the present invention wherein multiple RRO correction values corresponding to multiple embedded servo sectors are stored in a data sector at the user data rate.

Referring now to FIG. 3, shown is a disk drive 72 according to an alternative embodiment of the present invention comprising a disk 71 with an alternative format. In this embodiment, a data sector 28 stores the RRO correction values for a plurality of corresponding embedded servo sectors 8. For example, the data sector 28A shown in FIG. 3 stores the RRO correction values for the following four embedded servo sectors 8A–8D. When the head 36 reads data sector 28A, the RRO correction values are stored in memory 52 and retrieved at the appropriate time as the head 36 passes over the following embedded servo sectors 8A–8D. This embodiment is more efficient with respect to the overhead needed to store the RRO correction values 34 on the disk since it requires fewer preamble 30 and sync mark 32 fields to implement.

Note that in the embodiments of FIGS. 2A, 2B and 3, the data sectors 28 which store the RRO correction values 34 are recorded directly after a servo sector 8. Alternatively, the data sectors 28 which store the RRO correction values 34 may be recorded anywhere within the user data area of the disk. The data sectors 28 which store the RRO correction values 34 are shown next to the servo sectors 8 in FIGS. 2A, 2B and 3 to illustrate the different wedge shapes due to the RRO correction values 34 being recorded at the user data rate across the zones whereas the embedded servo sectors 8 are recorded at a servo data rate that is different than the user data rate.

Data Sector Format

Figure 4A:
FIGS. 4A and 4B show alternative embodiments for the format of the data sector of FIGS. 2A and 2B for storing the RRO correction value.
Figure 4B:
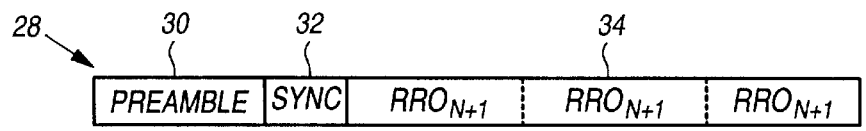
Figure 5A:
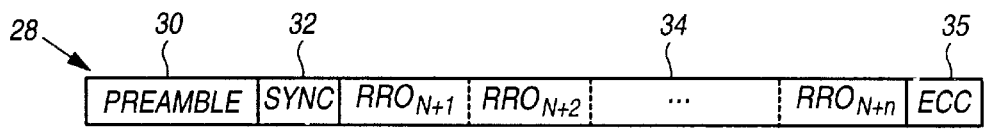
FIGS. 5A and 5B show alternative embodiments for the format of the data sector of FIG. 3 for storing the multiple RRO correction values.
Figure 5B:
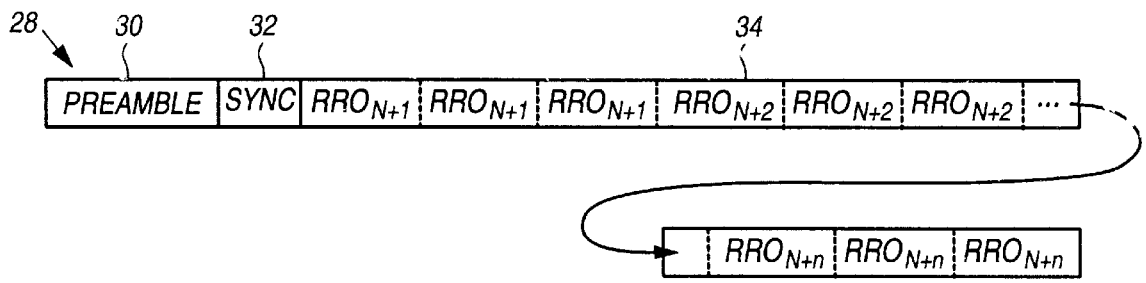

Example formats for the data sectors 28 which store the RRO correction values 34 is illustrated in FIGS. 4A–4B for the embodiments of FIGS. 2A and 2B, and in FIGS. 5A–5B for the embodiment of FIG. 3. Regardless as to the particular format, each data sector 28 comprises a preamble field 30 to allow the timing recovery and gain control to acquire the appropriate frequency, phase, and gain settings. Each data sector 28 further comprises a sync mark 32 for symbol synchronizing to the RRO correction value 34.

Referring now to FIG. 4A, shown is an exemplary format for the data sectors 28 which store the RRO correction values 34 employed in the embodiments of FIGS. 2A and 2B. This format includes a check code such as error correction code (ECC) redundancy symbols 39 appended to the end of the RRO correction value 34 for use in detecting and correcting errors in the RRO correction value 34.

An alternative format for the data sectors 28 which store the RRO correction values 34 employed in the embodiments of FIGS. 2A and 2B is shown in FIG. 4B. This format does not employ ECC but instead repeats the RRO correction value three times. A majority vote is then employed to select the most likely RRO correction value during read back which provides for a certain amount of error detection and correction of the RRO correction value 34.

The corresponding data sector formats for the embodiment of FIG. 3 are shown in FIGS. 5A and 5B. The formats are essentially the same as in FIGS. 4A and 4B, except that the RRO correction values 34 are stored as multiple RRO correction values 34 corresponding to multiple embedded servo sectors 8. In this embodiment, the format of FIG. 5A may be more efficient than that of FIG. 5B since it may be more efficient to add ECC redundancy symbols 39 rather than repeat the RRO correction values when numerous RRO correction values 34 are stored in the data sector 28.

Flow Diagrams

Figure 6:
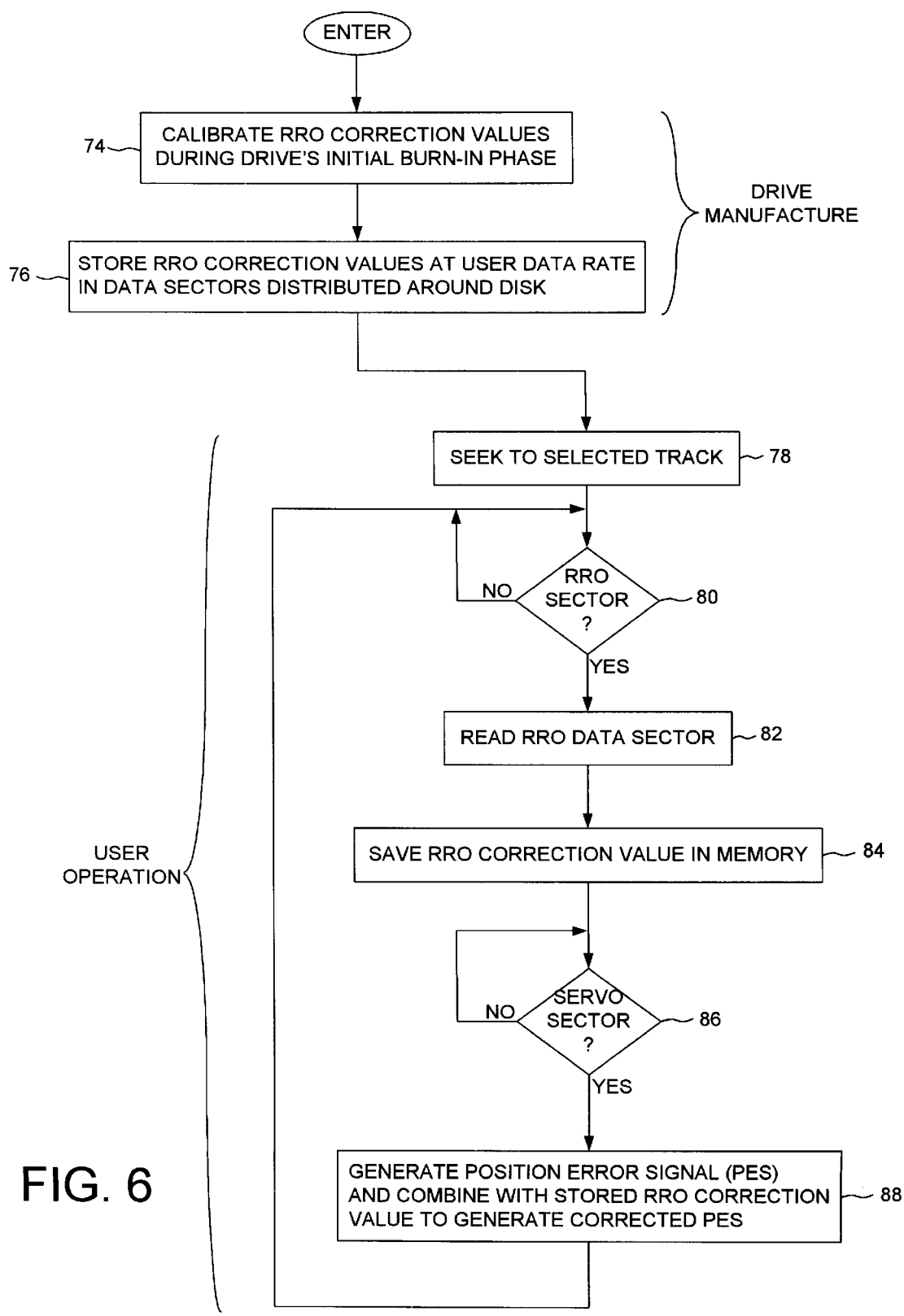
FIG. 6 is a flow diagram illustrating an embodiment of the present invention.

Referring now to FIG. 6, shown is a flow diagram illustrating an embodiment of the present invention. The flow diagram is broken into the steps performed during manufacture of a disk drive and during user operation of the disk drive.

At step 74, the RRO correction values are calibrated during the disk drive's initial burn-in phase after the servo sectors have been written to the disk. The RRO correction values are stored in the data sectors 28 distributed around the disk at step 76. Once the disk drive has been placed in operation, the RRO correction values stored in the data sectors 28 are used to attenuate the actual RRO from the servo control effort.

During a user operation (read or write) the head 36 seeks to a selected track at step 78. Then at step 80 the disk drive waits for the disk to spin until the head reaches a data sector 28 which stores an RRO correction value 34. For example, the disk drive can include a table identifying data sectors including RRO correction values. At step 82 the data sector 28 is read to retrieve the RRO correction value stored therein, and at step 84 the RRO correction value is saved in memory 52. At step 86 the disk drive waits for the disk to spin until the head reaches a servo sector 8. Then at step 88 a position error signal (PES) 58 is generated from the servo bursts 20 and the PES 58 is combined with the RRO correction value stored in memory 52 to generate a corrected PES 64.

Figure 7:
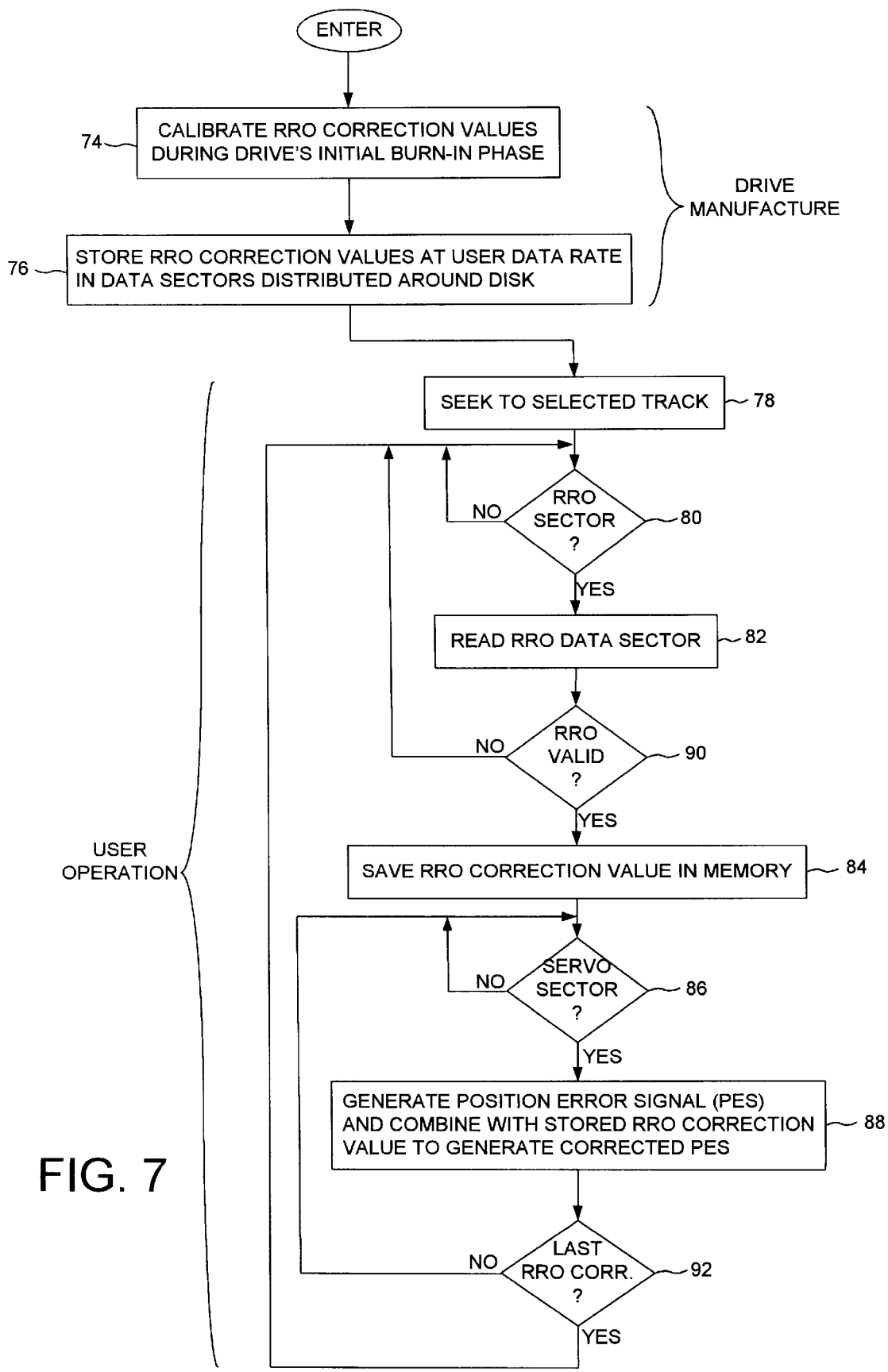
FIG. 7 is a flow diagram illustrating an alternative embodiment of the present invention.

The flow diagram of FIG. 7 is essentially the same as that of FIG. 6 with the additional steps of verifying the validity of the RRO correction value(s) stored in the data sector 28 at step 90, as well as a branch at step 92 for processing multiple RRO correction values stored in a data sector 28. The validity of the RRO correction value(s) is determined at step 90 using the ECC redundancy symbols 39 when employing the data sector format of FIG. 4A or 5A, or using a majority vote algorithm when employing the data sector format of FIG. 4B or 5B. If the RRO correction value(s) is not recoverable at step 90, then control branches to step 80 in order to read the RRO correction value(s) stored in a subsequent data sector. When multiple RRO correction values are stored in a data sector 28 as in the embodiment shown in FIG. 3, the RRO correction values are buffered in memory 52 and retrieved at the appropriate times as the following embedded servo sectors 8 are processed. Steps 86 and 88 are repeated until the last RRO correction value stored in memory 52 has been processed at step 92.

We claim:

1. A disk drive comprising:
   (a) a disk comprising a track having repeatable runout (RRO), the track comprising:
      a plurality of embedded servo sectors including servo information stored at a servo data rate; and
      a plurality of data sectors between the embedded servo sectors, wherein:
         the track is headerless in that the plurality of data sectors are uninterrupted by sector identification data; and
         one of the plurality of data sectors includes a RRO correction value to compensate for the RRO, the RRO correction value being stored at a user data rate different than the servo data rate;
   (b) a head;
   (c) a voice coil motor (VCM) for positioning the head over the track; and
   (d) a servo control system responsive to the servo information and the RRO correction value for generating a VCM control signal that is applied to the VCM for positioning the head over the track.

2. The disk drive of claim 1 wherein the head generates a read signal, the embedded servo sectors comprise servo bursts, and the servo control system further comprises:
   a read channel responsive to the read signal for detecting at the user data rate the RRO correction values stored in the data sectors;
   a memory for storing the detected RRO correction value;
   a position error generator responsive to the servo bursts for generating a position error signal (PES) indicative of a location of the head with respect to a centerline of the track;
   means for combining the detected RRO correction value with the PES to form a corrected position error signal (CPES); and
   a servo compensator, responsive to the CPES, for generating the VCM control signal applied to the VCM for positioning the head over the track.

3. The disk drive as recited in claim 1, wherein an RRO correction value for an embedded servo sector is stored in a data sector preceding the embedded servo sector.

4. The disk drive as recited in claim 1, wherein at least two RRO correction values for at least two embedded servo sectors are stored in a data sector preceding the embedded servo sectors.

5. The disk drive as recited in claim 1, wherein at least two copies of the RRO correction value are stored in a data sector for use as redundancy in detecting and correcting errors in the RRO correction value during read back.

6. A method of compensating for repeatable runout (RRO) in a track recorded on a disk, wherein the track comprises a plurality of embedded servo sectors including servo information stored at a servo data rate, and a plurality of data sectors between the embedded servo sectors, one of the plurality of data sectors includes a RRO correction value used to compensate for the RRO, the RRO correction value being stored at a user data rate different than the servo data rate, the method comprising the steps of:
   (a) seeking a head to a selected one of the plurality of tracks using a voice coil motor (VCM);
   (b) generating a VCM control signal in response to the servo information and the RRO correction value stored at the user data rate; and
   (c) applying the VCM control signal to the VCM to position the head over the selected track, wherein:
the track is headerless in that the plurality of data sectors are uninterrupted by sector identification data.

7. The method of compensating for repeatable runout (RRO) in a track as recited in claim 6, further comprising the steps of:
(e) reading the RRO correction value with the head to generate a read signal;
(f) detecting at the user data rate the RRO correction value from the read signal;
(g) storing the RRO correction value in a memory;
(h) waiting until the head is positioned over an embedded servo sector;
(i) generating a head position error signal (PES) indicative of a location of the head with respect to a centerline of the selected track; and
(j) retrieving the RRO correction value from the memory and combining the RRO correction value with the PES to from a corrected position error signal (CPES), wherein the CPES is used to generate the VCM control signal for use in positioning the head over the selected track.

8. The method of compensating for repeatable runout (RRO) in a track as recited in claim 6, wherein an RRO correction value for an embedded servo sector is stored in a data sector preceding the embedded servo sector.

9. The method of compensating for repeatable runout (RRO) in a track as recited in claim 6, wherein at least two RRO correction values for at least two embedded servo sectors are stored in a data sector preceding the embedded servo sectors.

10. The method of compensating for repeatable runout (RRO) in a track as recited in claim 6, wherein at least two copies of the RRO correction value are stored in a data sector for use as redundancy in detecting and correcting errors in the RRO correction value during read back.

* * * * *